(12) United States Patent
Kintou et al.

(10) Patent No.: US 6,430,471 B1
(45) Date of Patent: Aug. 6, 2002

(54) CONTROL SYSTEM FOR CONTROLLING A MOBILE ROBOT VIA COMMUNICATIONS LINE

(75) Inventors: Yasuhisa Kintou, Amagasaki; Akira Nukuzuma, Yokohama; Satoshi Himeda, Amagasaki, all of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/464,770

(22) Filed: Dec. 16, 1999

(30) Foreign Application Priority Data

Dec. 17, 1998 (JP) ............................ 10-359079

(51) Int. Cl.⁷ .............................................. G06F 19/00
(52) U.S. Cl. .................... 700/245; 700/122; 318/468; 473/588; 180/169; 714/1; 714/2.1; 714/712
(58) Field of Search .......................... 700/245, 122, 700/150; 714/712, 1, 2.1; 318/468; 706/45; 29/429, 709, 823; 358/468, 444; 379/100.05; 473/588; 180/169; 901/7

(56) References Cited

U.S. PATENT DOCUMENTS

| | | | | |
|---|---|---|---|---|
| 4,669,168 A | * | 6/1987 | Tamura et al. ............... 29/429 |
| 5,051,906 A | * | 9/1991 | Evans et al. ................ 180/169 |
| 5,193,143 A | * | 3/1993 | Kaemmer et al. ............. 706/45 |
| 5,224,157 A | * | 6/1993 | Yamada et al. ......... 379/100.05 |
| 5,242,257 A | * | 9/1993 | Tobise ......................... 318/255 |
| 5,245,257 A | * | 9/1993 | Tobise ...................... 264/297.2 |
| 6,266,162 B1 | * | 7/2001 | Okamura et al. ............ 358/468 |
| 6,338,013 B1 | * | 1/2002 | Ruffner ....................... 473/588 |

FOREIGN PATENT DOCUMENTS

| | | |
|---|---|---|
| JP | 08320727 | 12/1996 |
| JP | 10079079 | 3/1998 |
| JP | 10-079097 | 3/1998 |
| JP | 200196876 A * | 7/2000 |

* cited by examiner

Primary Examiner—William A. Cuchlinski, Jr.
Assistant Examiner—McDieunel Marc
(74) Attorney, Agent, or Firm—McDermott, Will & Emery

(57) ABSTRACT

To correct delayed transmission of instructions associated with increased communication load on a communications line, so as to safely and reliably control a working robot, a system for controlling an operation unit performing a plurality of operations is configured to include a working robot and a controlling personal computer transmitting in operation a command via a wireless LAN and a wired LAN to control an operation. The controlling personal computer detects the load of a communication between the working robot and the controlling personal computer and limits a predetermined one of the plurality of operations depending on the detection result.

6 Claims, 13 Drawing Sheets

CONTROL SYSTEM FOR CONTROLLING A MOBILE ROBOT VIA COMMUNICATIONS LINE

This application is based on application No. 10-359079 filed in Japan, the contents of which is hereby incorporated by reference.

BACKGROUND OF THE INVENTION

1. Field of the Invention

The present invention relates generally to control systems and particularly to control systems for remotely controlling a mobile robot via a network.

2. Description of the Related Art

There has been a demand for automation of the maintenance and check of locations too dangerous to enter, such as factories, atomic power plants. There has also been a demand for automation of patrol in buildings, particularly night patrol, considering the issue of personnel expenses. Such maintenance and check and patrol can be automated by installing various types of sensors or the like at locations required to be checked. If a large area must be thoroughly checked, however, a multitude of sensors must be installed and an extremely increased cost will be required for installing the sensors. To overcome this disadvantage, there has been provided a mobile robot known as having a scheme allowing the robot to move around in an area freely to observe in detail the environment surrounding the robot. This robot can move in any directions, with a charge coupled device camera (referred to as a CCD camera hereinafter) mounted thereto so that the environment surrounding the robot can be imaged. The mobile robot can be moved to a location to be checked and a site to be checked can be imaged with the CCD camera. As such, automation of check for the purpose of maintenance, and patrol can be achieved at low cost.

A conventional mobile robot is adapted to communicate with a control device for controlling the robot, to receive an operation instruction and make a movement accordingly. If there is an obstacle in the direction in which the robot moves, the robot must change its route or stop to avoid the obstacle. Such operation instructions as route change, stop are input by the operator to the control device and thus transmitted to the robot, as appropriate. The robot sends to the control device the positional information of the robot and the moving images provided by the CCD camera. The operator uses the information and images displayed on a display, to determine the environment surrounding the robot and accordingly input an operation instruction indicative of an subsequent operation to be performed by the robot.

However, if the mobile robot and the control device transmitting operation instructions to the robot do not communicate via a dedicated line but a network used by an uncertain, large number of users, such as the Internet, constant data communication rate cannot be ensured in the communications between the robot and the control device. As such, the time elapsing after the robot transmits to the control device an image provided by the CCD camera and before the robot receives an operation instruction determined based on the transmitted image, varies with the network's communication rate. If the network uses the Internet its communication rate varies, e.g., with the number of users and it is thus difficult to predict how the communication rate varies. As such, when with a communication rate extremely reduced an operator monitoring a moving image on the control device's display finds that the robot will collide with a wall and the operator accordingly transmits an operation instruction to stop the robot, the robot may have already collided with the wall.

SUMMARY OF THE INVENTION

To overcome the above disadvantage, one object of the present invention is to provide a control system capable of correcting a deficiency associated with delayed transmission of an instruction resulting from increased communication load.

Another object of the present invention is to provide a control system capable of safely and reliably controlling an operation unit.

Still another object of the present invention is to provide a mobile robot system capable of correcting a deficiency associated with delayed transmission of an instruction resulting from increased communication load.

Still another object of the present invention is to provide a mobile robot system capable of safely and reliably controlling a mobile robot.

Still another object of the present invention is to provide a control method capable of correcting a deficiency associated with delayed transmission of an instruction resulting from increased communication load.

Still another object of the present invention is to provide a control method capable of safely and reliably controlling a robot.

To achieve the above objects, in one aspect of the present invention the control system controlling an operation unit performing a plurality of operations includes an instruction unit to transmit an instruction to the operation unit via a communications line to control the operation, a detector to detect a load of a communication between the operation unit and the instruction unit, and an operation controller to limit a predetermined one of the plurality of operations depending on a detection result from the detector.

In accordance with the present invention, a detection result from the detector can be used to limit a predetermined one of the plurality of operations. As such there can be provided a control system capable of correcting delayed transmission of an instruction associated with increased communication load. Furthermore there can be provided a control system capable of safely and reliably controlling the operation unit.

In another aspect of the present invention, the mobile robot system includes a self-propelled mobile robot to perform a plurality of operations, a remote control device to transmit to the mobile robot an instruction for controlling the operation, a detector to detect a load of a communication between the mobile robot and the remote control device, and an operation controller to control the operation of the mobile robot depending on a detection result from the detector, regardless of the instruction from the remote control device.

In accordance with the present invention, a detection result from the detector can be used to control an operation of the mobile robot, regardless of the instruction from the remote control device. As such there can be provided a mobile robot system capable of correcting delayed transmission of an instruction associated with increased communication load. Furthermore there can be provided a mobile robot system capable of safely and reliably controlling the mobile robot.

In accordance with the present invention, in still another aspect the method of remotely controlling a robot performing a plurality of operations includes the steps of transmitting an operation instruction from a remote device to a robot, detecting a load of a communication between the remote device and the robot, and controlling an operation of the robot depending on a detected communication load, regardless of the operation instruction from the remote device.

In accordance with the present invention, depending on the detected communication load an operation of the robot can be controlled, regardless of the operation instruction from the remote device. As such there can be provided a control method capable of correcting delayed transmission of an operation instruction associated with increased communication load. Furthermore there can be provided a method capable of safely and reliably controlling an operation of the robot.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A control device of an embodiment of the present invention will now be described with reference to the drawings. The control device of the first embodiment is included in a controlling personal computer for remotely controlling a working robot such that the control device detects degradation in communication rate through the communications between the controlling personal computer and the working robot. Its communications method is a one-to-one communications method assuming that the controlling personal computer transmits an operation command and a server 14 of the working robot responsively returns a status indicative of a result of executing the operation command. While the working robot is a robot which patrols around in buildings, the present invention is also applicable to mobile bodies providing other types of work.

Figure 1:
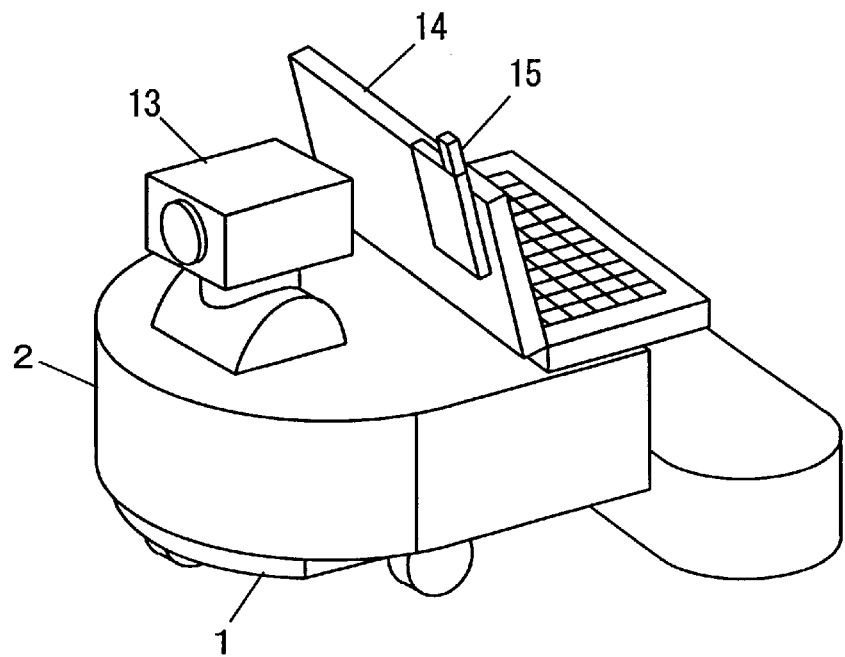
FIG. 1 is a perspective external view of a working robot of a first embodiment of the present invention.

Referring to FIG. 1, the robot includes a working portion 2, a CCD camera 13 mounted on an upper portion of working portion 2, a notebook-type personal computer 14, and a wireless local area network (LAN) 15 used for wirelessly communicating with a controlling personal computer. CCD camera 13 is capable of operations such as panning, tilting, zooming. Personal computer 14 is a battery-driven, notebook-type personal computer connected via wireless LAN 15 through a network to the controlling personal computer for controlling the working robot. It also serve as a server interpreting an operation command received from the controlling personal computer and transmitting the interpreted operation command to the working robot. Wireless LAN 15 wirelessly communicates with another wireless LAN connected to the controlling personal computer, to implement network connection.

Figure 2:
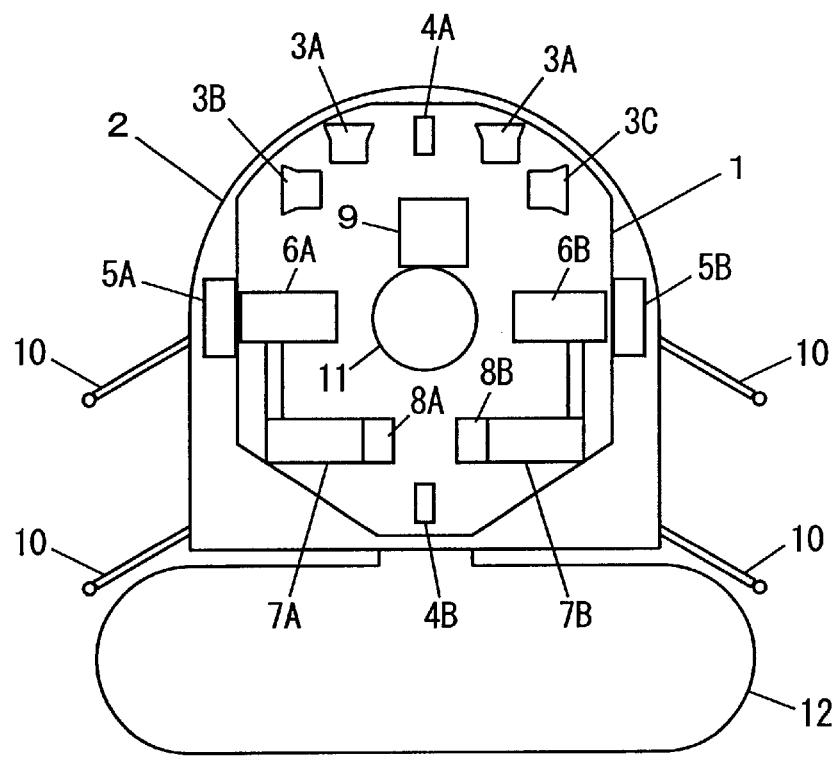
FIG. 2 schematically shows a configuration of a working robot.

FIG. 2 schematically shows an internal configuration of the working robot. In the figure, the working robot includes working portion 2, a running portion 1, a contact sensor 10, a right-hand drive wheel 5A, a left-hand drive wheel 5B, a right-hand drive wheel shaft bearing 6A, a left-hand drive wheel shaft bearing 6B, a right-hand drive motor 7A, a left-hand drive motor 7B, a swiveling, front caster wheel 4A, a swiveling, rear caster wheel 4B, a working arm 12, a working-portion rotating shaft 11, a working-portion rotation drive motor 9, an ultrasonic, front distance-measuring sensor 3A, an ultrasonic, right-hand distance-measuring sensor 3B, and an ultrasonic, left-hand distance-measuring sensor 3C.

Working portion 2 is mounted on running portion 1 and supported on running portion 1 rotatably around working-portion rotating shaft 11 perpendicular to the floor surface. Working portion 2 is rotatably driven by working-portion rotation drive motor 9. Running portion 1 is that for moving the working robot.

Contact sensor 10 detects the distance from the robot to a wall adjacent the robot when the robot moves along the wall. Contact sensor 10 is configured as follows: at the left and right sides of working portion 2 there is mounted a potentiometer with a shaft thereof attached rotatably around a vertical axis and also having a rod attached to the shaft and protruding laterally. At the tip of the rod there is a ball attached to prevent the wall from being damaged. Contact sensor 10 thus configured is mounted to the working robot on the right and left sides thereof at two, front and rear locations.

Right- and left-hand drive wheels 5A and 5B are directly linked to right- and left-hand drive wheel shaft bearings 6A and 6B, respectively. Right-hand drive wheel shaft bearing 6A is connected to right-hand drive motor 7A via a belt which transmits the power of right-hand drive motor 7A to right-hand drive wheel shaft bearing 6A. Similarly, left-hand drive wheel shaft bearing 6B is connected to left-hand drive motor 7B via a belt. Right- and left-hand drive wheels 5A and 5B are rotatable independently of each other. Their rotation rates are measured by a right-hand encoder 8A and a left-hand encoder 8B mounted to the respective shafts of right- and left-hand drive motors 7A and 7B to detect each drive motor's rotation rate.

Right- and left-hand drive motors 7A and 7B are fixed to a vehicle-mounting plate of running portion 1 and controlled independently of each other. Right- and left-hand drive motors 7A and 7B rotatably drive right- and left-hand drive wheels 5A and 5B independently of each other to allow the robot to proceed, retreat, turn, curve, and the like. The robot has a movement rate that can be varied as desired by controlling the rotation rates of right- and left-hand drive motors 7A and 7B. Swiveling, front and rear caster wheels 4A and 4B, cooperating with right- and left-hand drive wheels 5A and 5B to support the vehicle, swivel as right- and left-hand drive wheels 5A and 5B rotate, to allow the robot to turn and curve smoothly.

Working arm 12, mounted sidably in a lateral direction relative to working portion 2, works as predetermined. Around working-portion rotating shaft 11, working portion 2 rotates relative to running portion 1. Working-portion rotation drive motor 9 allows working portion 2 to rotate relative to running portion 1. Ultrasonic, front, right-hand, and left-hand distance-measuring sensors 3A, 3B, 3C measure the distances of the robot from any obstacles in the frontward, rightward and leftward directions, respectively. Such ultrasonic distance-measuring sensors may alternatively be optical distance-measuring sensors.

Figure 3:
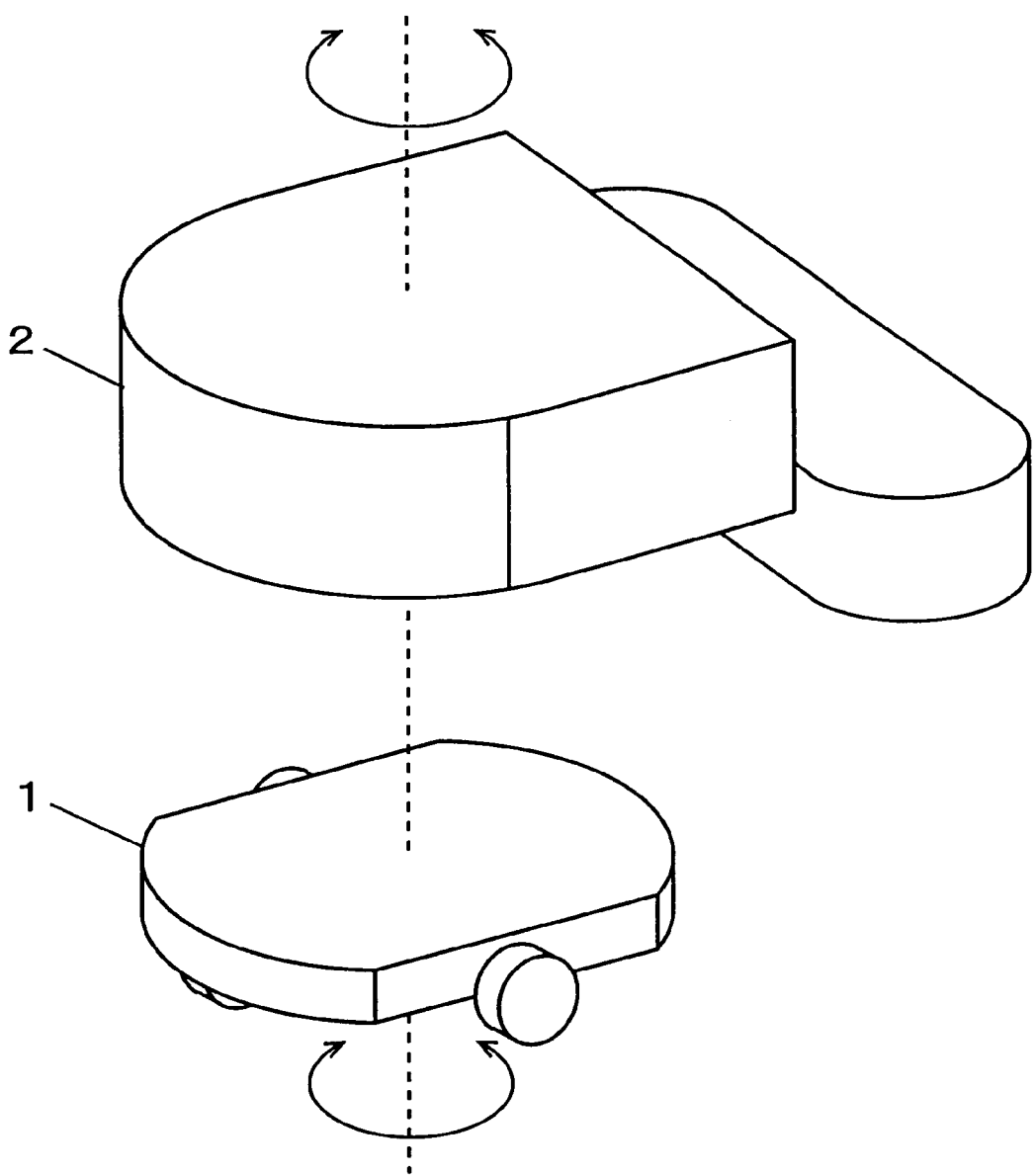
FIG. 3 is a schematic view for illustrating an operation of a running portion and a working portion of the robot.

FIG. 3 schematically shows running portion 1 rotated relative to working portion 2 rightwards by 90°. Running portion 1 rotated by the drive wheels relative to the floor surface in a direction at an angle, and working portion 2 also rotated at the same angle but in the opposite direction, allow working portion 2 to be maintained stationary relative to the floor surface. As such, CCD camera 13 mounted on the upper portion of working portion 2 can have an unmoved field of view, while the direction in which running portion 1 moves can be varied.

Figure 4:
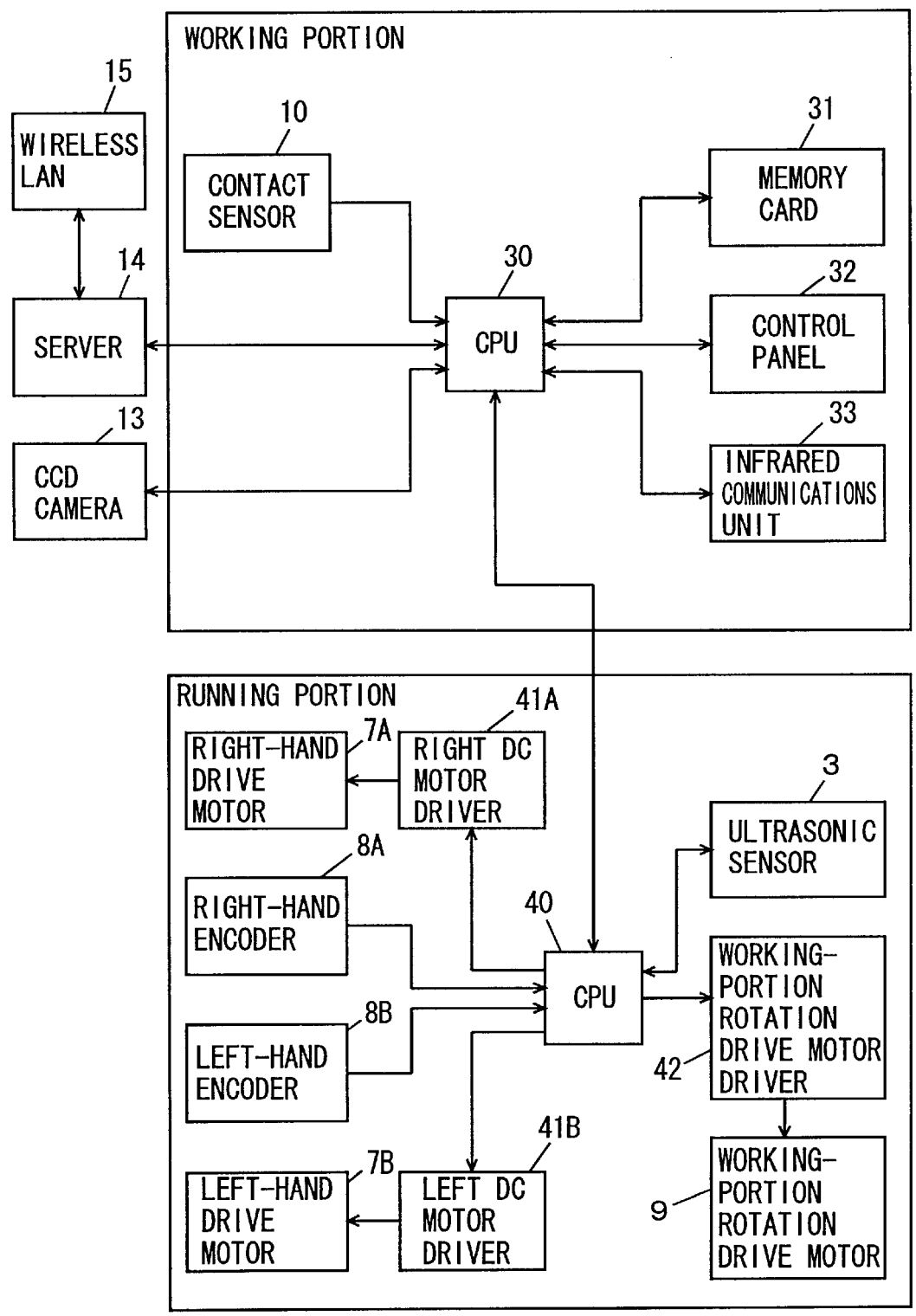
FIG. 4 is a block diagram showing a configuration of a control system of the robot.

FIG. 4 is a block diagram showing a schematic configuration of a control system of the working robot. In the figure, the working robot includes a central processing unit (CPU) 40 generally controlling running portion 1, and a CPU 30 generally controlling working portion 2. CPUs 30 and 40 can be mutually connected to transmit and receive controlling information to and from each other.

CPU 40 is connected to a right DC motor driver 41A for driving right-hand drive motor 7A, a left DC motor driver 41A for driving left-hand drive motor 7B, right- and left-hand encoders 8A and 8B, a working-portion rotation drive motor driver 42 for driving working-portion rotation drive motor 9, and ultrasonic sensors 3A, 3B, 3C. CPU 40 monitors and uses outputs from right- and left-hand encoders 8A and 8B to control the rotation rates of right- and left-hand drive motors 7A and 7B to control the robot to proceed, retreat, curve, turn, and the like. CPU 40 also controls the robot's movement in response to outputs from ultrasonic sensors 3A, 3B, 3C.

Right-hand encoder 8A measures and outputs the rotation rate of right-hand drive motor 7A to CPU 40. Left-hand encoder 8B measures and outputs the rotation rate of left-hand drive motor 7B to CPU 40.

CPU 30 is connected to contact sensor 10, a memory card 31, a control panel 32, and an infrared communications unit 33.

Memory card 31 is a rewritable memory for storing a program describing in operation commands a series of operations performed by CPUs 30 and 40. The series of operation commands stored in memory card 31 can be executed by CPU 30 or 40 to provide a series of work. An operation command is input to memory card 31 via control panel 32.

Control panel 32, mounted at an upper side of working portion 2, is provided in the form of a keyboard used, e.g., for inputting an operation command to memory card 31, an instruction to execute a series of input commands or stop such commands from being executed.

Infrared communications unit 33 can use a function for transmitting and receiving infrared lights to communicate with an external infrared communications device. As such, instead of communications from server 14 via a wireless LAN to a network, infrared wireless communications can also be used via infrared communications unit 33.

CPU 30 is also connected to CCD camera 13 and server 14 mounted on an upper portion of working portion 2. CPU 30 controls various operations of CCD camera 13, such as panning, tilting, zooming, and also receives image data obtained via CCD camera 13.

Server 14 communicates with the controlling personal computer connected to wireless LAN 15. Such communications will be described later further in detail. Server 14 receives an operation command from the controlling personal computer and transmits it to CPU 30. CPU 30 executes the operation command received from server 14 and transmits to server 14 the status information indicative of a result of the execution of the operation command. The operation command which CPU 30 receives from server 14 includes an operation to be performed by working portion 2 and that to be performed by running portion 1. The operation command indicative of the operation to be performed by running portion 1 is transmitted to CPU 40. CPU 40 executes the operation and transmits the status information indicative of a result of the execution of the operation to server 14 via CPU 30.

CPU 30 uses the image information received from CCD camera 13 and the information from ultrasonic sensors 3A, 3B, 3C indicative of the distance from the working robot to any obstacle, to provide the environmental information on the environment around the position of the robot, such as information in the form of a map of a room in which the robot is located. Furthermore, positional information is calculated indicative of the position of the robot in the environment. The environmental and positional information are transmitted to the controlling personal computer via server 14.

Figure 5A:
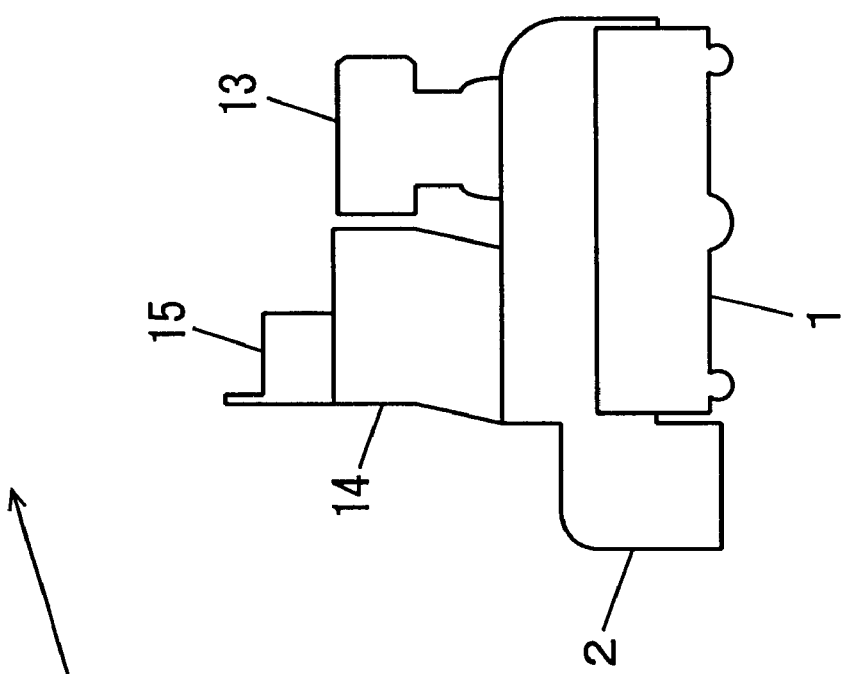
FIGS. 5A and 5B show an exemplary arrangement provided to control a working robot via a network via communication between controlling personal computer and the robot.
Figure 5B:
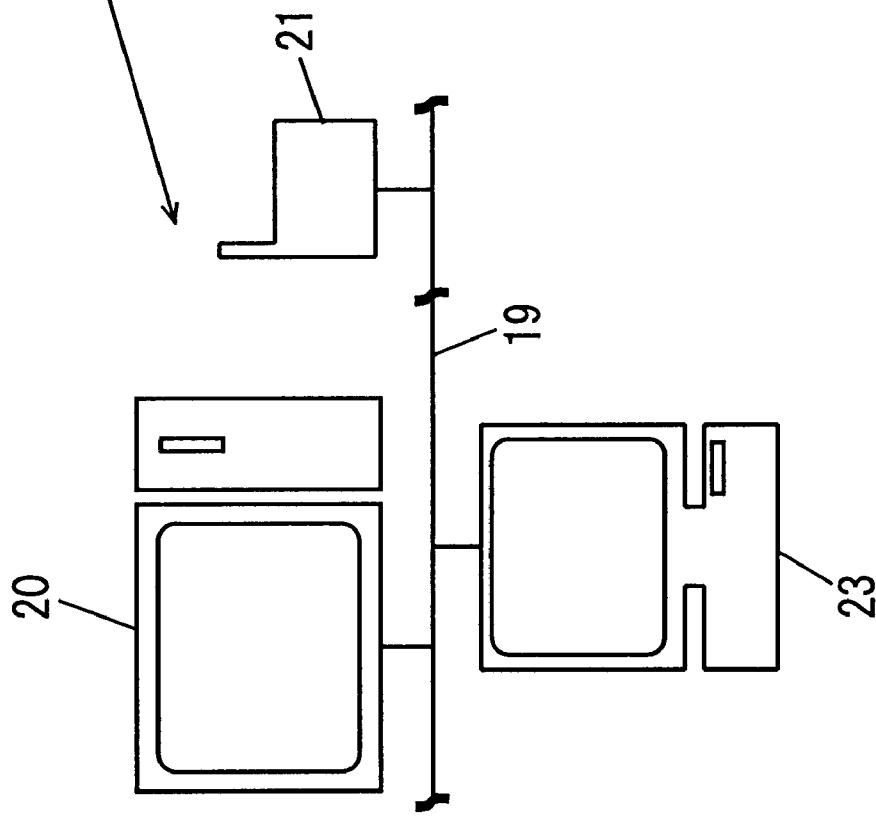

FIGS. 5A and 5B show an exemplary configuration for remotely controlling the working robot of the present embodiment via communication between controlling personal computer 20 and the robot. In the figures, controlling personal computer 20 is connected to a wired LAN 19 connected to wireless LAN 21. Wireless LAN 15 of the robot and wireless LAN 21 connected to wired LAN 19 mutually communicate wirelessly. As such, the communications between controlling personal computer 20 and the working robot are provided via the network formed by wired LAN 19 and wireless LANs 15 and 21. For example, a command from controlling personal computer 20 is transmitted via wired LAN 19 and received by wireless LAN 21 and then further transmitted from wireless LAN 21 and received by wireless LAN 15 and thus server 14.

Figure 6:
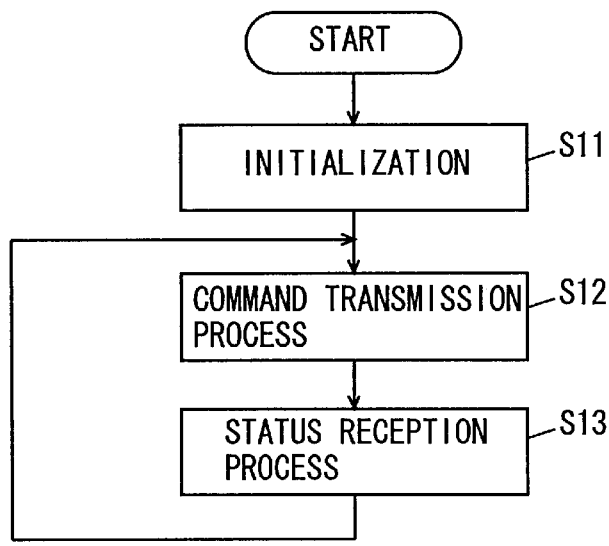
FIG. 6 is a main flow chart of a process performed in a controlling personal computer in the first embodiment.

FIG. 6 is a flow chart of a process performed by controlling personal computer 20. In the figure, initialization is performed at step S11. In the initialization, a timer incorporated in the controlling personal computer is initiated so as to measure the time which elapses after a process is started. Then a command transmission process is provided to transmit an operation command to server 14 of the robot (step S12), and a status reception process is provided to receive a status corresponding to a result of the robot executing the operation command (step S13).

Figure 7:
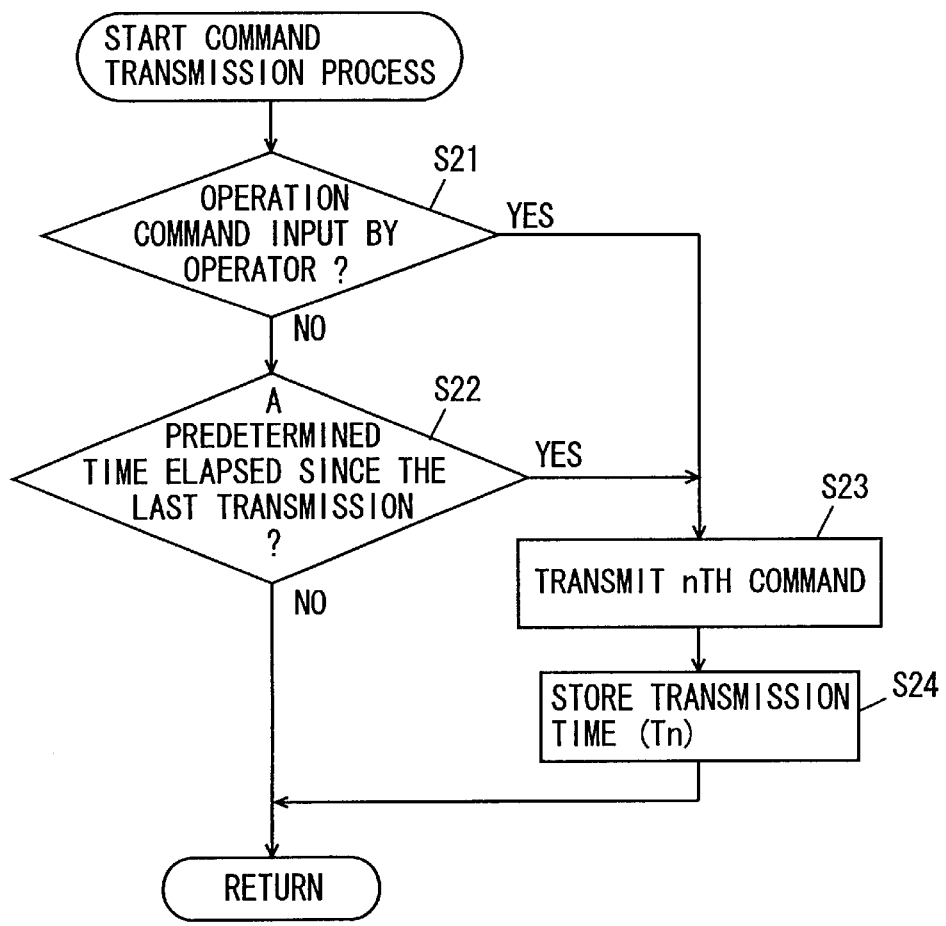
FIG. 7 is a flow chart of a command transmission process.

FIG. 7 is a flow chart of the command transmission process performed at the FIG. 6 step S12. Controlling personal computer 20 in communication with the robot's server 14 constantly checks whether an operation command is input from an operator (step S21). Furthermore, if there is not any command input by the operator, controlling personal computer 20 constantly at intervals as predetermined communicates with server 14 of the robot automatically (step S22) to retransmit a command in case that an defective network or the like should prevent server 14 from receiving the command. Furthermore, an operation command different from that input by the operator may be transmitted, such as an operation command to request server 14 to return a status indicative of the server's acknowledgement that it has received a command, an operation command, e.g., requesting the positional information on the robot.

A command transmitted to the robot's server 14 includes a command number (n) indicative of when the command is transmitted, and an operation command. Such command is transmitted to server 14 (step S23). When the command is transmitted, controlling personal computer 20 stores as the timing of the command's transmission the time which has elapsed since the internal timer was initiated (Tn) (step S24). Thus the command transmission process is completed and the control returns to the FIG. 6 main routine.

Figure 8:
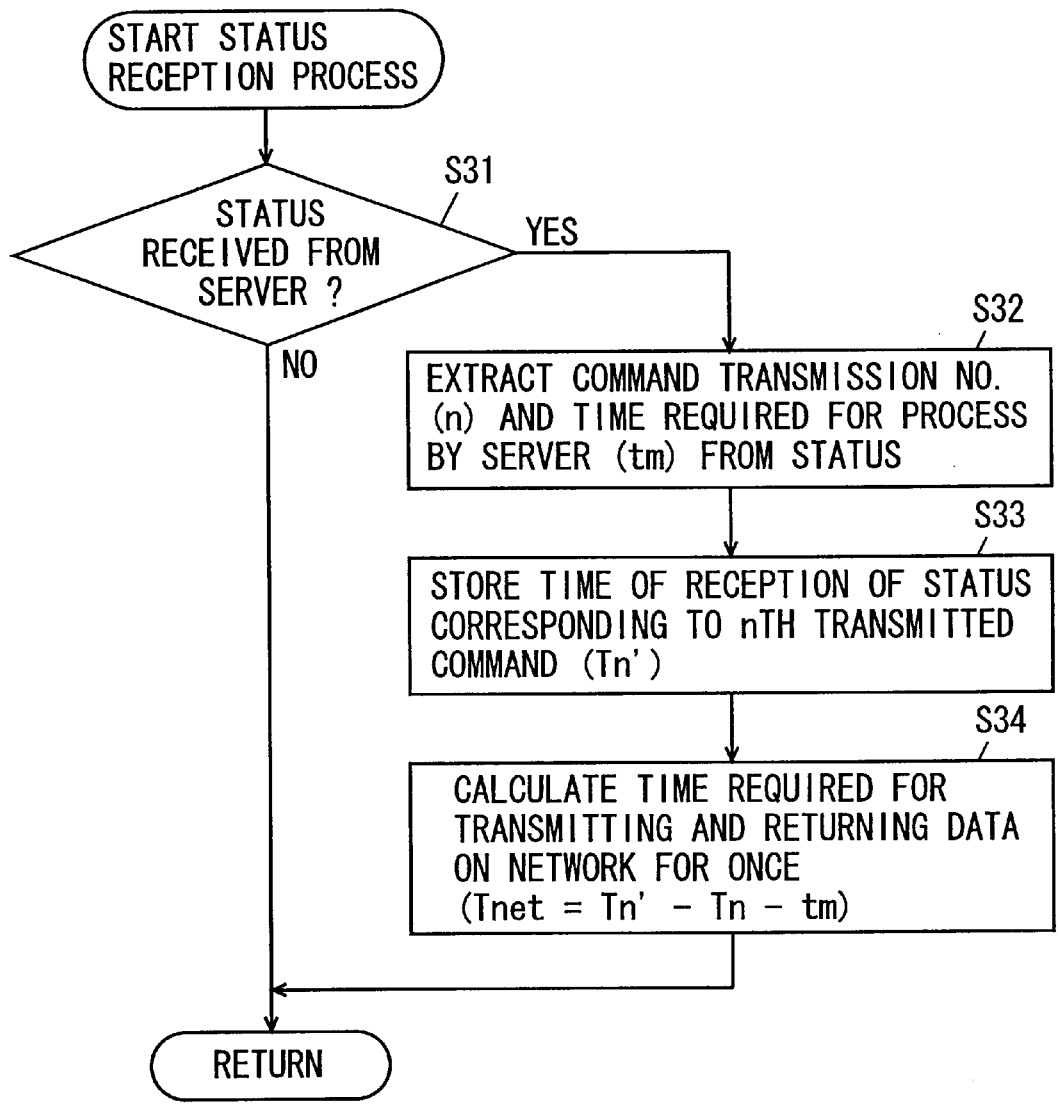
FIG. 8 is a flow chart of a status reception process.

FIG. 8 is a flow chart of the status reception process performed at step S13 shown in FIG. 6. After Controlling personal computer 20 transmits a command, it waits for a status from the working robot's server 14 (step S31). Once it receives a status from server 14 (YES at step S31), controlling personal computer 20 can refer to the command number (n) in the received status to know where in the transmitting order of the operation commands having been transmitted to server 14 the command associated with the returned status was once placed (step S32). When it receives a status associated with the nth transmitted operation command, controlling personal computer 20 stores the time currently measured by the internal timer (Tn') (step S33). Time Tn stored when an operation command is transmitted, time Tn' stored when a status associated with the operation command is received, and a time tm included in the status to represent the working time elapsing when server 14 processes the command are used to calculate a time Tnet. It should be noted that Tnet represents the time elapsing while communicated data are transmitted and returned on a network for once. (step S34). Tnet is obtained by the expression:

$$Tnet = Tn' - Tn - tm.$$

Figure 9:
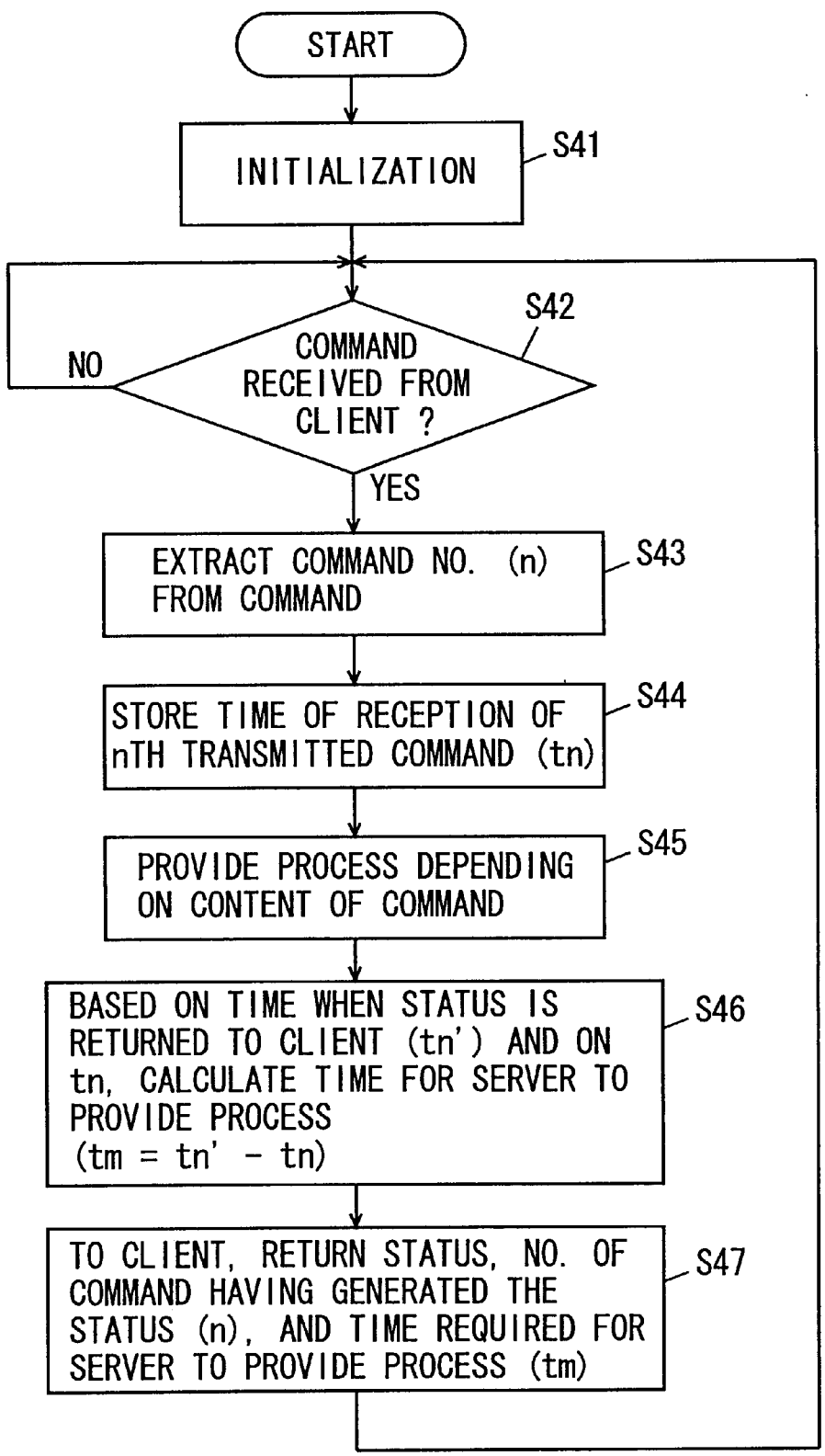
FIG. 9 is a flow chart of a process performed in a server 14 of the working robot of the first embodiment.

FIG. 9 is a flow chart of a process performed by server 14 of the working robot. In the figure, server 14 is initialized when it is initiated (step S41), and server 14 waits for a command from controlling personal computer 20 (step S42). When it receives a command from controlling personal computer 20, server 14 extracts a command number (n) from the received command (step S43) and stores the time measured by the internal timer when the command is received (tn) (step S44). Server 14 then identifies an operation command included in the received command and provides a process accordingly (step S45). Such process can include, e.g., transmitting the operation command to CPU 30 of working portion 2. After the operation command is executed, server 14 returns a status indicative of a result of the execution of the operation command. It should be noted that before returning the status, server 14 calculates working time tm by subtracting tn from the time which elapses after the timer incorporated in server 14 is initiated and before the status is returned (tn'), i.e., tm=tn'−tn (step S46). Then server 14 returns to controlling personal computer 20 the command number (n) produced the status and the calculated working time tm together with the status. (step S47).

As such, controlling personal computer 20 transmits a command to the working robot's server 14 while it calculates time Tnet required for transmitting and returning communicated data on a network for once.

Controlling personal computer 20 compares the obtained communication time Tnet with a predetermined threshold value Tlimit to perform a limitation process including the following two subprocess:

(1) The operation rate of a dangerous operation performed by the working robot is limited depending on communication time Tnet. For example, The robot's movement rate is limited depending on communication time Tnet. A command limiting the operation is transmitted to the robot.

(2) An operation stop instruction is immediately transmitted to the robot's server 14 to effect a limitation so that thereafter if the operator inputs an operation command associated with a dangerous operation such as to move the robot the command is not accepted. Operation commands input by the operator that instruct the robot to perform operations which are not dangerous, are accepted, such as those instructing to proide such CCD camera 13 operations as panning, tilting, zooming.

This limitation process controls the working robot to limit the robot's movement rate depending on communication time Tnet. A specific example of the process will now be described.

A relationship between the working robot's movement rate and communication time Tnet is determined considering the following conditions. Assume that the robot has a normal movement rate of 30 cm/sec and that a time of 1000 ms/sec elapses between the time at which the operator of the robot watching an image from CCD camera 13 on a screen of the display of controlling personal computer 20 recognizes that the robot will collide with an obstacle if it continues to move and the time at which the operator inputs a stop command to controlling personal computer 20.

The limitation process provided under such conditions limits the robot's movement rate depending on communication time Tnet so as to avoid the risk of the robot colliding against the obstacle with the robot 60 cm distant from the obstacle when CCD camera 13 images the obstacle.

More specifically, when communication time Tnet is no less than Tlimit 1 (1000 ms) and less than Tlimit 2 (2000 ms), the above control process (1) is provided to allow controlling personal computer 20 to transmit to the robot's server 14 an operation command to limit the robot's movement rate. The robot's movement rate v and communication time Tnet has a relationship therebetween represented by the following expression:

$$v = \frac{60}{Tnet + 1000} \times 1000 \quad (1)$$

For example, when communication time Tnet is 1500 ms, the robot's movement rate is limited to 24 cm/sec. As such, the time elapsing after CCD camera 13 images the obstacle and before server 14 receives an operation command instructing to stop the robot is the sum of communication time Tnet (1500 ms) and a time of 1000 ms elapsing before the command is input by the operator monitoring the display of controlling personal computer 20, i.e., 2500 ms. In the meantime, the robot with the movement rate of 24 cm/sec moves a distance of 60 cm. As such, with server 14 receiving the operation command instructing to stop the robot, the robot can stop without colliding with the obstacle. Similarly, for communication time Tnet of 2000 ms, the robot's movement rate is limited to 20 cm/sec.

When communication time Tnet is no less than threshold value Tlimit 2 (2000 ms), the above limitation process (2) is provided. In this case a minimal time of 3000 ms elapses after CCD camera 13 images an obstacle and before server 14 receives an operation command instructing to stop the robot. More specifically, communication time Tnet (of no less than 2000 ms) and a time of 1000 ms elapsing before the operation command is input by the operator monitoring the display of controlling personal computer 20 sum up to 3000 ms. During that period of time the robot with the movement rate of 20 cm/sec moves a distance of no less than 60 cm. This distance is no less than the distance between the robot and the obstacle measured when CCD camera 13 images the obstacle, i.e., no less than 60 cm. Thus the robot will have collided with the obstacle when server 14 receives the operation command to stop the robot.

To avoid the collision, when communication time Tnet is no less than threshold value Tlimit 2 (2000 ms) controlling personal computer 20 immediately transmits to server 14 a command to stop the robot's movement. As such, if the robot is moving, its movement can be stopped to prevent it from colliding with the obstacle. Furthermore, when communication time Tnet is no less than threshold value Tlimit 2 (2000 ms), any operation command input to controlling personal computer 20 that instructs the robot to move is not accepted. As such, any operation command instructing to move the robot is not transmitted to the robot, so that the robot is maintained stopped and thus does not collide with the obstacle. In such condition, however, operation commands other than that instructing to move the robot can be accepted, such as panning, tilting and zooming CCD camera 13, and transmitted to the robot. As such, if communication time Tnet is no less than threshold value Tlimit 2, CCD camera 13 can be continuously panned, tilted, zoomed, and the like.

Figure 10:
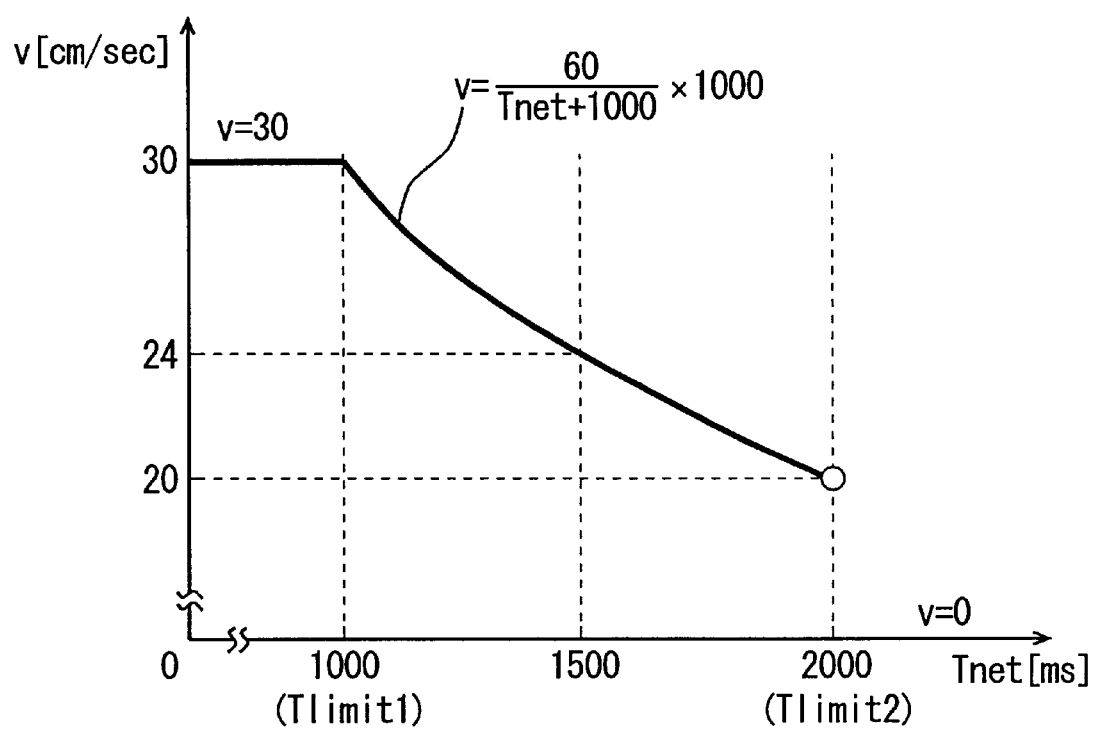
FIG. 10 is a graph of the robot's movement rate versus communication time.

FIG. 10 is a graph of the working robot's movement rate versus communication time Tnet. In the figure, when communication time Tnet is less than 1000 ms (Tlimit 1), the robot'movement rate is 30 cm/sec. When communication time Tnet is no less than 1000 ms (Tlimit 1) and less than 2000 ms (Tlimit 2), movement rate v and communication time Tnet has the relationship as represented by expression (1). For example, for a communication time Tnet of 1500 ms, a movement rate of 24 cm/sec is provided. When communication time Tnet is no less than 2000 ms (Tlimit 2), a movement rate of zero is provided.

Figure 11:
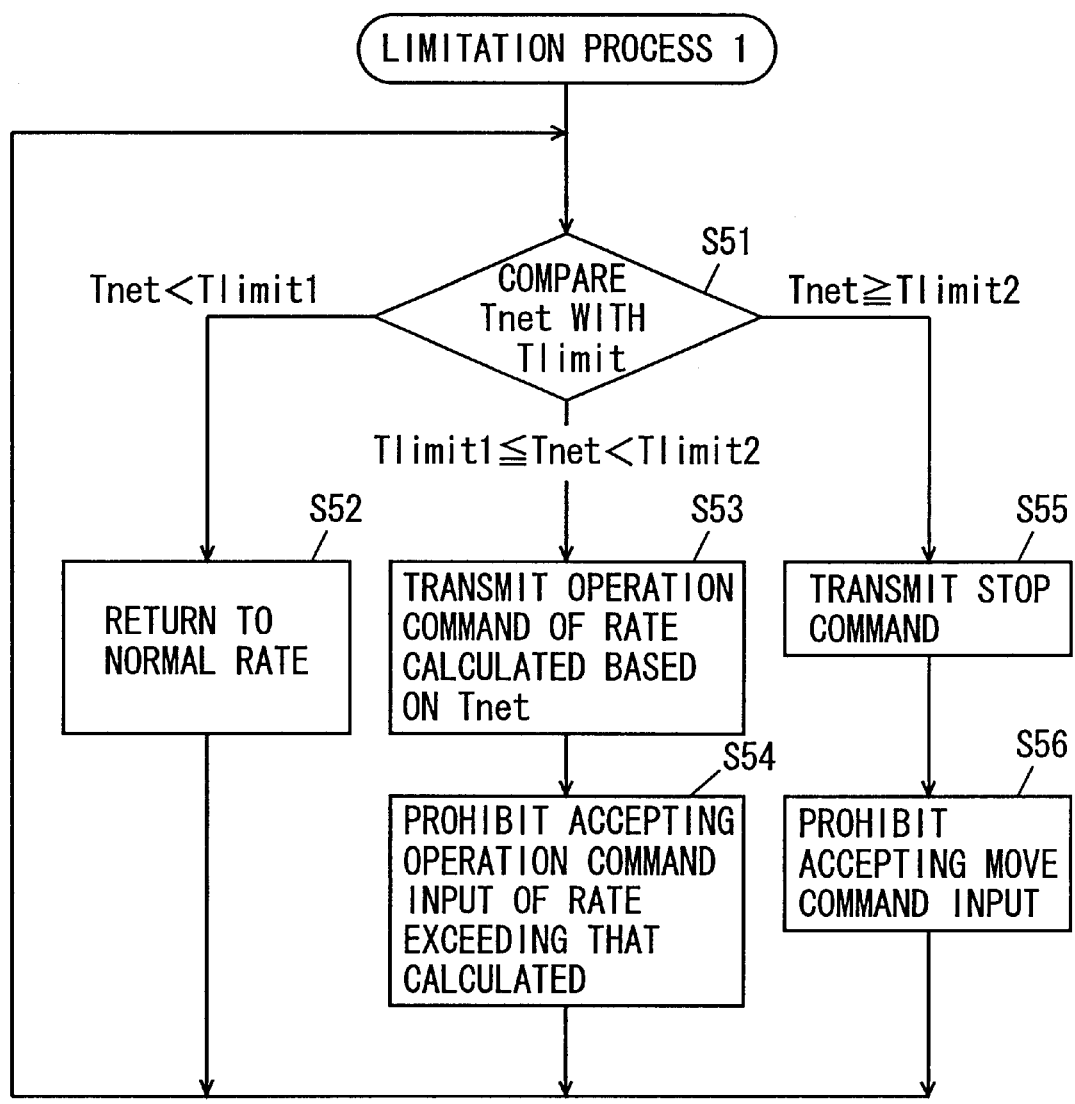
FIG. 11 is a flow chart of a limitation process performed in a controlling personal computer 20 in the first embodiment.

FIG. 11 is a flow chart of a limitation process performed by controlling personal computer 20. In the figure, communication time Tnet required to transmit and return communicated data on a network for once is compared with a predetermined threshold value Tlimit (step S51).

When Tnet is less than Tlimit 1, determination is made that a communication rate sufficient for a communication is ensured, and a normal movement rate (30 cm/sec) is set and an operation command is transmitted to the robot's server 14 (step S52).

When Tnet is no less than Tlimit 1 (1000 ms) and less than Tlimit 2 (2000 ms), the robot's server 14 receives a command to limit the robot's movement rate to movement rate v calculated based on expression (1) (step S53). In controlling personal computer 20, accepting any operation command input instructing to move the robot at a rate exceeding movement rate v is prohibited (step S54). As such the operator can recognize that the current communication rate is degraded.

When Tnet is no less than Tlimit 2, determination is made that a communication rate sufficient for a communication is not ensured, and a stop command to stop the robot from moving is transmitted to the robot's server 14 (step S55). In controlling personal computer 20, accepting any operation command input instructing to move the robot is prohibited (step S56). As such the operator can recognize that a communication rate sufficient for operating the robot is not ensured.

As described above, the control device of the present embodiment can be provided to controlling personal computer 20 remotely controlling a working robot and it can constantly monitor communication time Tnet in communications with the robot and, depending on the quantity of communication time Tnet, limit a dangerous operation of the robot, such as a movement thereof. As such, if the robot is remotely controlled via a network which cannot constantly ensure a stable throughput, the robot can avoid, e.g., colliding with an obstacle while operations which are not dangerous, such as to pan, tilt and zoom CCD camera 13, can be continued at a normal rate.

Furthermore, a rate of a dangerous operation such as a movement of the robot can be limited to a rate calculated based on expression (1), so that the dangerous operation such as the movement of the robot can be performed while the danger associated with the operation can also be avoided.

Second Embodiment

In the first embodiment, when communication time Tnet is no less than Tlimit 1 and less than Tlimit 2 a robot has a limited movement rate calculated based on expression (1). In the second embodiment, a plurality of threshold values are provided to gradually limit the robot's movement rate. The second embodiment has the same hardware configuration of controlling personal computer 20 and the working robot and the communications therebetween as the first embodiment, and a description thereof will not be repeated. Controlling personal computer 20 provides the process represented in the FIGS. 6–8 flow charts and the robot's server 14 provides the process represented in the FIG. 9 flow chart.

Figure 12:
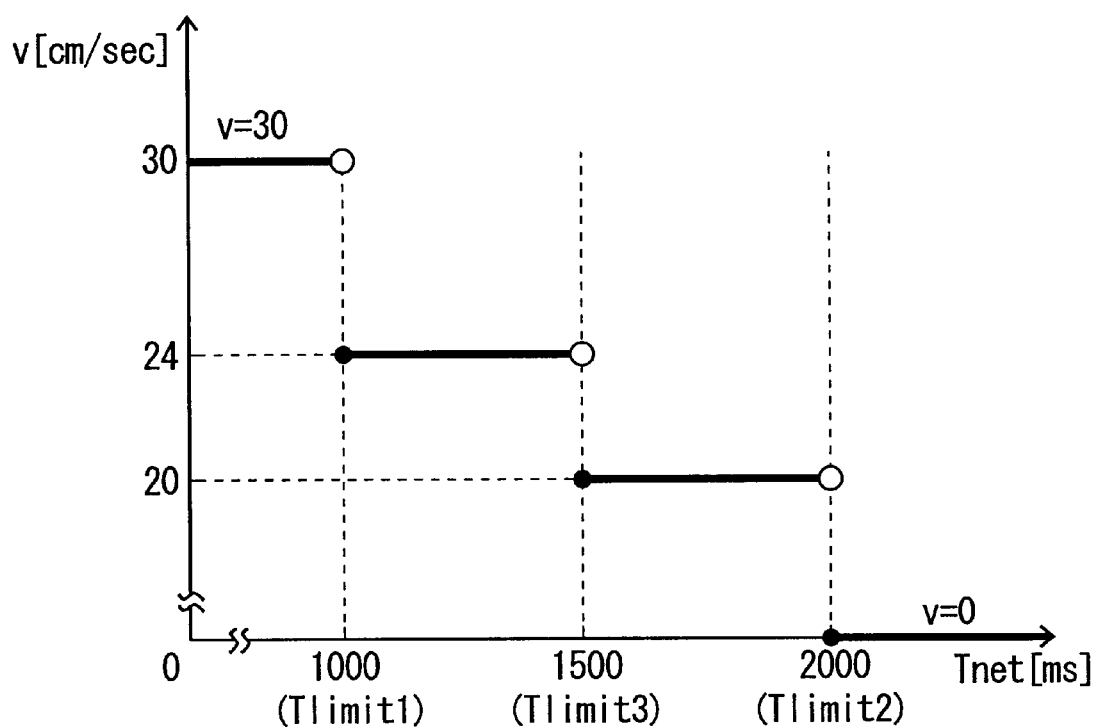
FIG. 12 is a second graph of the robot's movement rate versus communication time.

FIG. 12 is a graph of movement rate v of the robot versus communication time Tnet when a plurality of threshold values are provided. In the figure, a threshold value Tlimit 3 (1500 ms) is set between threshold values Tlimit 1 (1000 ms) and Tlimit 2 (2000 ms). As such, communication time Tnet and the robot's movement rate v has a relationship therebetween as follows:

(1) a movement rate of 30 cm/sec is provided when Tnet<Tlimit 1;

(2) a movement rate of 24 cm/sec is provided when Tlimit 1≦Tnet<Tlimit 3;

(3) a movement rate of 20 cm/sec is provided when Tlimit 3≦Tnet<Tlimit 2; and (4) a movement rate of 0 cm/sec is provided when Tnet>Tlimit 1.

With the robot's movement rate controlled depending on the FIG. 12 relationship between communication time Tnet and movement rate v, it is not necessary to calculate the robot's movement rate. This can simplify the limitation process performed by server 14 to be applied to the robot.

Figure 13:
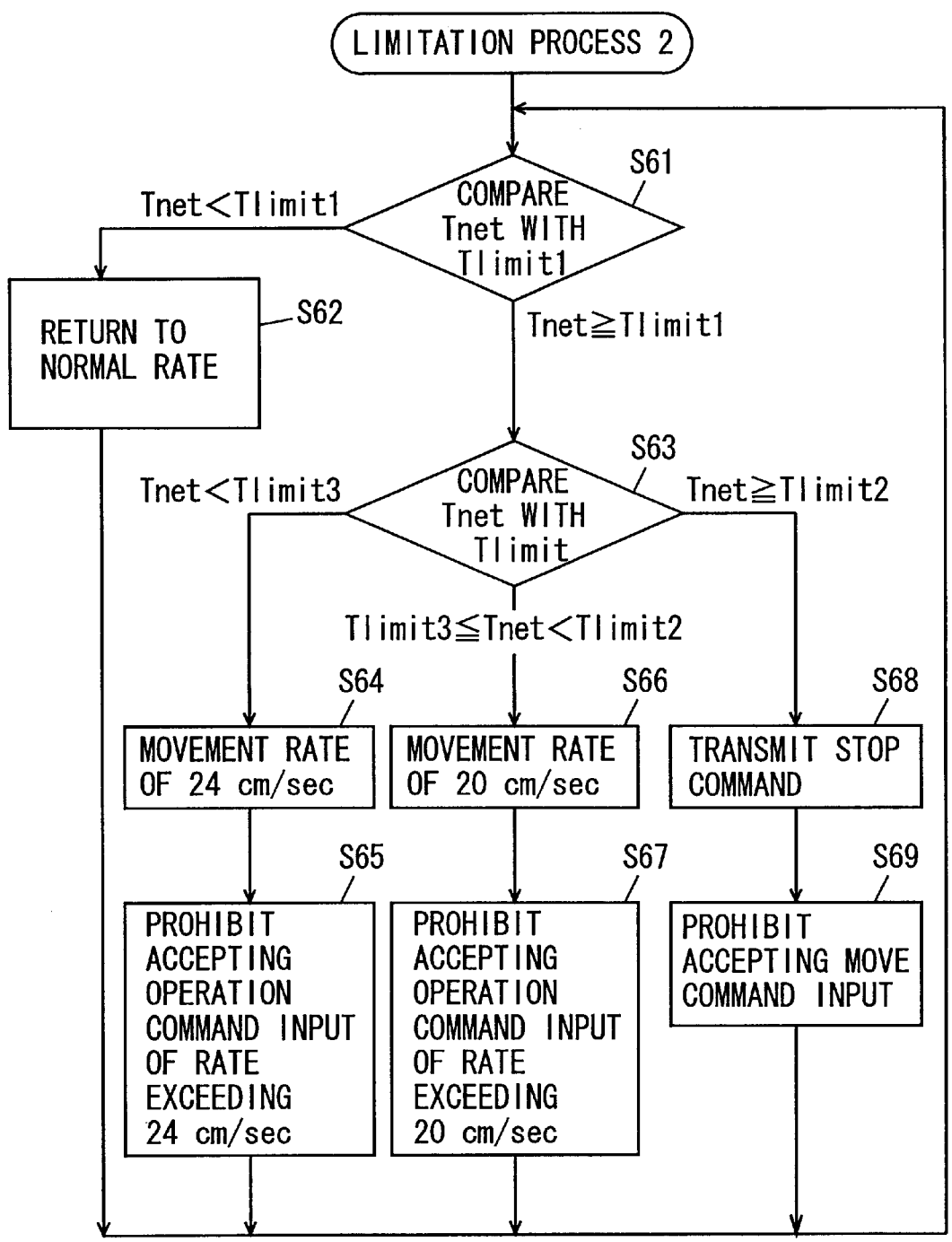
FIG. 13 is a flow chart of a limitation process performed in a controlling personal computer 20 of a second embodiment of the present invention.

FIG. 13 is a flow chart of a limitation process performed by controlling personal computer 20 of the present embodiment. In the figure, time Tnet required for transmitting and returning communicated data on a network for once is compared with a predetermined threshold value Tlimit 1 (step S61).

If Tnet is less than Tlimit 1, determination is made that a communication rate sufficient for a communication is ensured. Thus a normal movement rate (of 30 cm/sec) is set and an operation command is transmitted to the robot's server 14 (step S62).

If Tnet is no less than Tlimit 1 (1000 ms), Tnet is further compared with predetermined threshold values Tlimits 2 and 3 (step S63). If Tnet is less than Tlimit 3 (1500 ms), a command limiting the robot's movement rate to 24 cm/sec is transmitted to the robot's server 14 (step S64). In controlling personal computer 20, accepting any operation command input instructing to move the robot at a rate exceeding 24 cm/sec is prohibited (step S65).

If Tnet is no less than Tlimit 3 (1500 ms) and less than Tlimit 2 (2000 ms), a command limiting the robot's movement rate to 20 cm/sec is transmitted to the robot's server 14 (step S66). In controlling personal computer 20, accepting any operation command input instructing to move the robot at a rate exceeding 20 cm/sec is prohibited (step S67).

When Tnet is no less than Tlimit 2 (1500 ms), determination is made that a communication rate sufficient for a communication is not ensured, and a stop command to stop the robot from moving is transmitted to the robot (step S68). In controlling personal computer 20, accepting any operation command input instructing to move the robot is prohibited (step S69). As such the operator can recognize that a communication rate sufficient for operating the robot is not ensured.

In addition to the effect achieved in the first embodiment, in the second embodiment the control device gradually limiting the robot's movement rate depending on the quantity of communication time Tnet can eliminate the necessity of calculating the robot's movement rate depending on Tnet, to simplify the limitation process performed by server 14 to be applied to the robot.

Third Embodiment

In the third embodiment the control device has controlling personal computer 20 adapted to measure communication time Tnet so that the measured communication time Tnet is transmitted to the robot's server 14 to allow server 14 to provide a limitation process to limit the robot's movement rate. The third embodiment has the same hardware configuration of controlling personal computer 20 and the working robot and the communications therebetween as the first embodiment, and a description thereof will not be repeated. Controlling personal computer 20 provides the process represented in the FIGS. 6–8 flow charts, although the step S34 of calculating communication time Tnet is followed by an additional step of transmitting communication time Tnet to the robot's server 14. Furthermore, the limitation process is performed in the working robot and controlling personal computer 20 thus does not provide the process represented in the FIG. 11 flow chart.

Server 14 provides the limitation process as follows:

(1) When the working robot performs a dangerous operation, the operation rate of the dangerous operation is limited to a rate depending on communication time Tnet. For example, the robot's movement rate is limited to a rate depending on communication time Tnet.

(2) An operation stop instruction is immediately transmitted to the robot to control the robot not to thereafter execute an operation command to perform a dangerous operation such as to move the robot if the command is received. If an operation command received via controlling personal computer 20 is that instructing the robot to perform an operation which is not dangerous, such as to pan, tilt, zoom CCD camera 13, the command is transparently transmitted to the robot to allow the robot to perform the operation.

Figure 14:
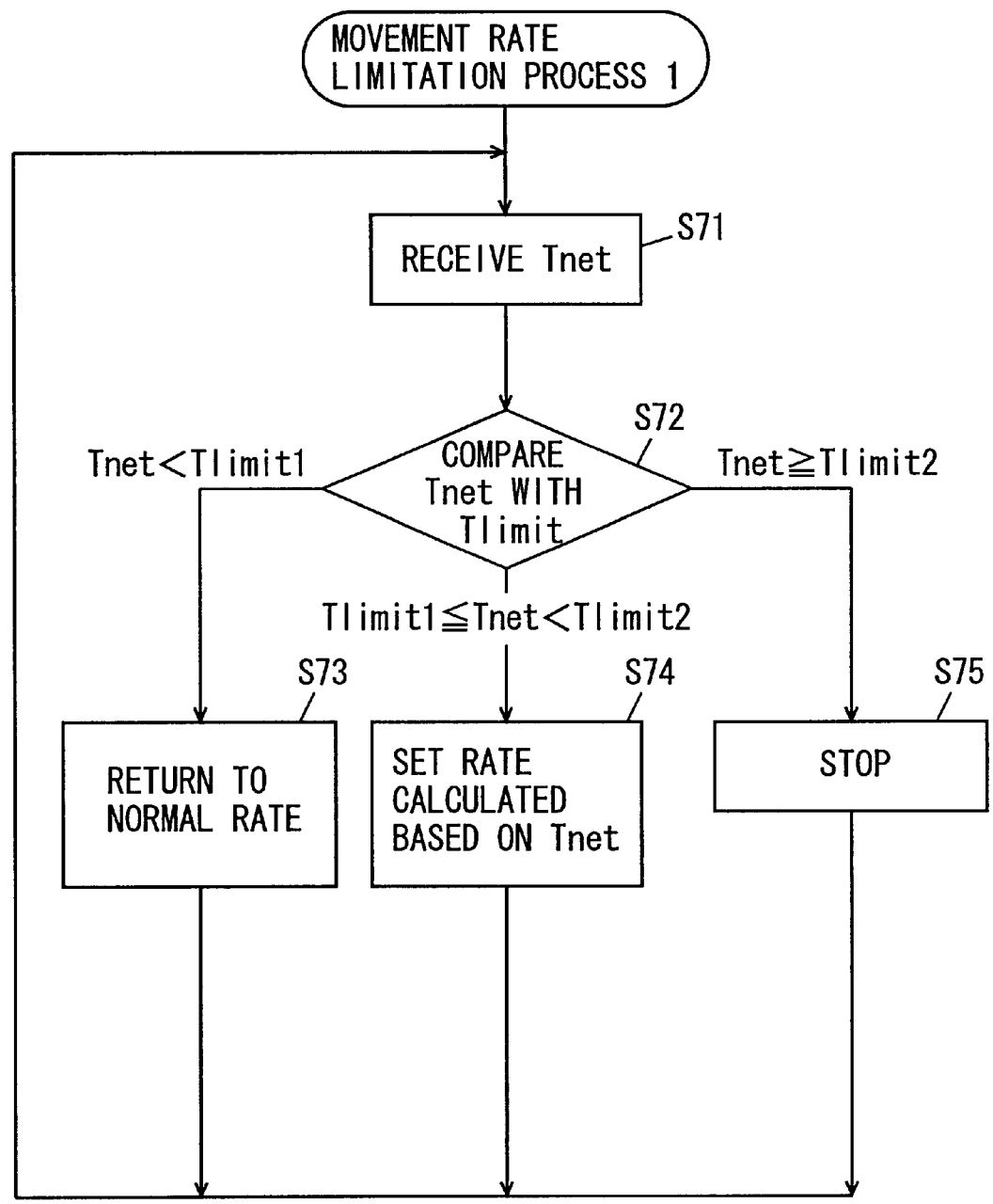
FIG. 14 is a flow chart of a movement rate limitation process performed in a server 14 of a working robot of a third embodiment of the present invention.

FIG. 14 is a flow chart representing a movement rate limitation process performed in server 14. This movement rate limitation process limits a movement rate depending on the relationship between movement rate and communication time Tnet shown in FIG. 10. Referring to FIG. 14, time Tnet required for transmitting and returning communicated data on a network for once is received from controlling personal computer 20 (step S71). The received communication time Tnet is compared with a predetermined threshold value Tlimit (step S72).

If Tnet is less than Tlimit 1, determination is made that a communication rate sufficient for a communication is ensured, so that a normal movement rate (30 cm/sec) is set and at the normal movement rate the robot moves (step S73). If Tnet is no less than Tlimit 1 (1000 ms) and less than Tlimit 2 (2000 ms), the robot's movement rate is limited to movement rate v calculated based on expression (1) (step S74). If Tnet is no less than Tlimit 2, determination is made that a communication rate sufficient for the communication is not ensured and the robot is stopped from moving (step S75).

As such, in the third embodiment the control device may have, in addition to the effect achieved in the first embodiment, controlling personal computer 20 adapted to measure communication time Tnet to allow the robot's server 14 to provide a limitation process to limit the robot's movement rate. Thus controlling personal computer 20 is not required to provide the limitation process, so that it can transmit less operation commands to server 14. Thus the load of controlling personal computer 20 and the communication load of the network can be reduced.

Fourth Embodiment

In the fourth embodiment the control device may be provided in a working robot to communicate with a controlling personal computer to detect degraded communication rate. The fourth embodiment has the same hardware configuration of controlling personal computer 20 and the working robot and the communications therebetween as the first embodiment, and a description thereof will not be repeated.

To measure a rate of a communication provided between controlling personal computer 20 and the robot's server 14, server 14 periodically transmits to controlling personal computer 20 a check command to check a communication rate therebetween. When controlling personal computer 20 receives the check command transmitted from server 14, it immediately returns the check command to the server 14 that has transmitted the check command. As such, server 14 can measure the time elapsing between the transmission by server 14 of the check command to controlling personal computer 20 and the reception by server 14 of the check command from controlling personal computer 20 to obtain communication time Tnet between server 14 and controlling personal computer 20. Server 14 uses the obtained communication time Tnet to limit the rate of a dangerous movement of the robot, as follows:

(1) the speed of the dangerous movement of the robot is limited depending on communication time Tnet. More specifically, the robot's movement rate is limited to a rate calculated based on expression (1).

(2) a dangerous operation of the robot is stopped, such as an movement thereof. If an operation command received via controlling personal computer 20 is that instructing the robot to perform an operation which is not dangerous, such as to pan, tilt, zoom CCD camera 13, the command is normally transmitted to the robot to allow the robot to perform the operation.

Figure 15:
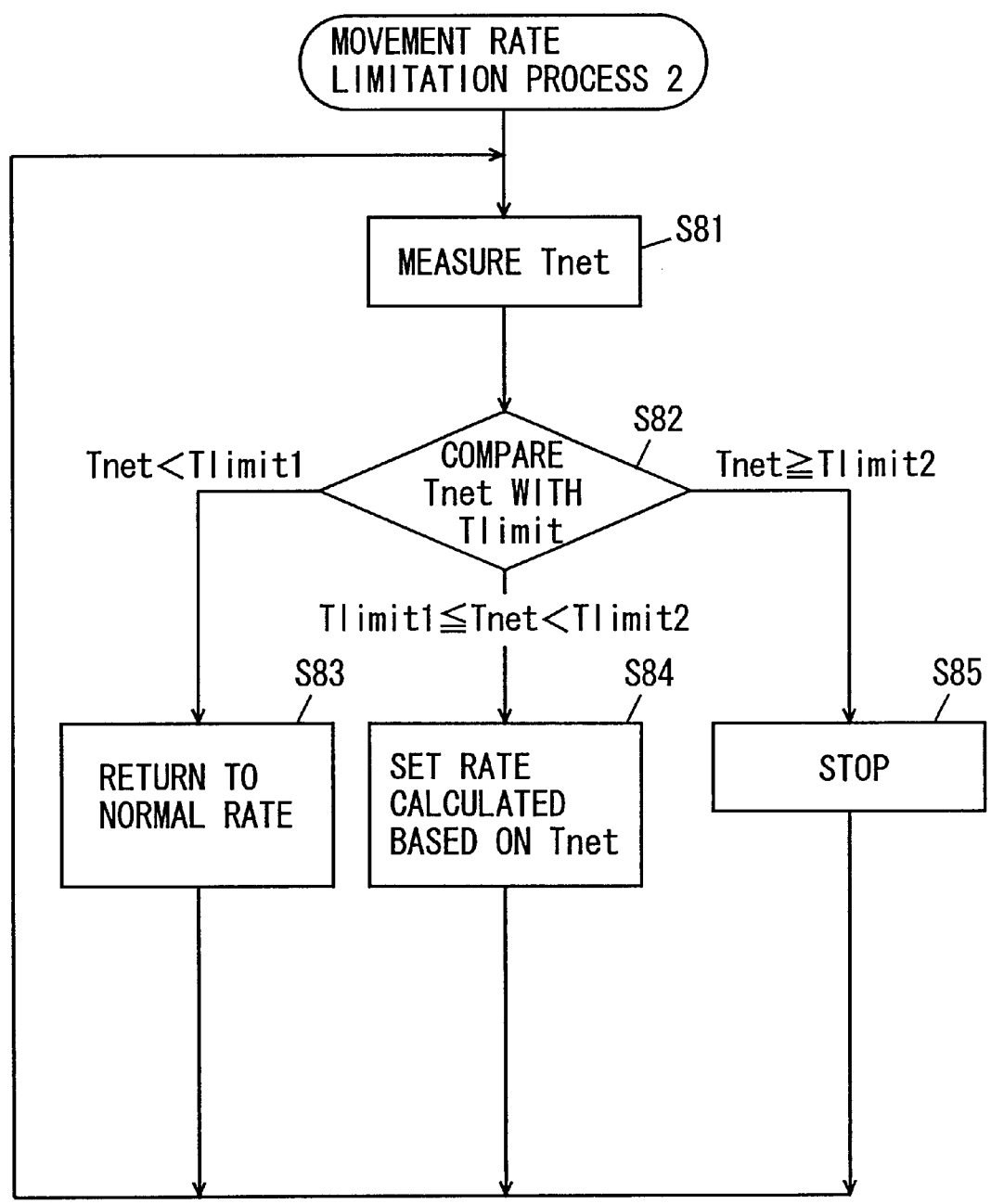
FIG. 15 is a flowchart of a movement rate limitation process performed in a server 14 of a working robot of a fourth embodiment of the present invention.

FIG. 15 is a flow chart representing the movement rate limitation process performed by the working robot in the fourth embodiment. This movement rate limitation process limits a movement rate depending on the relationship between movement rate and communication time Tnet represented in FIG. 10. Referring to FIG. 15, communication time Tnet is measured (step S81) and compared with a threshold value Tlimit (step S82).

If communication time Tnet is less than threshold value Tlimit 1 (1000 ms), the robot's movement rate is set to a normal rate of 30 cm/sec (step S83). If communication time Tnet is no less than Tlimit 1 (1000 ms) and less than Tlimit 2 (2000 ms), the robot's movement rate is set to a rate calculated based on expression (1) (step S84). For example, for a communication time Tnet of 1500 ms, a movement rate of 24 cm/sec is set. If communication time Tnet is no less than Tlimit 2 (2000 ms), the robot's movement rate is set to zero (step S85).

As has been described above, in the present embodiment the control device can be provided in the robot's server 14 and monitor a communication time required for a communication provided between controlling personal computer 20 and server 14 to limit the operation rate of a dangerous operation of the robot, such as the robot's movement rate, depending on communication time Tnet. As such, if the robot is remotely controlled via a network which cannot constantly ensure a stable throughput, the robot can avoid, e.g., colliding with an obstacle while operations which are not dangerous, such as to pan, tilt and zoom CCD camera 13, can be continued at a normal rate. Furthermore, the load of controlling personal computer 20 and the quantity of communication on the network can be reduced.

In the present embodiment the FIG. 10 relationship between movement rate v and communication time Tnet is used to limit the working robot'movement rate. However, the FIG. 12 relationship between movement rate v and communication time Tnet may also be used to gradually limit the working robot'movement rate. This allows server 14 to readily control the robot.

While in the above embodiment the control device is provided in either the working robot's server 14 or controlling personal computer 20, the control device may be provided in both server 14 and controlling personal computer 20.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system for controlling an operation unit performing a plurality of operations, comprising:

an instruction unit to transmit an instruction to said operation unit to control said operation unit;

a detector to detect a time required for a communication provided between said operation unit and said instruction unit; and an operation controller to limit a predetermined operation of said plurality of operations, depending on a detection result from said detector.

2. The control system of claim 1, wherein said operation controller prohibits said predetermined operation.

3. The control system of claim 2, wherein said instruction unit includes a control device for inputting said instruction to remotely control said operation unit, and wherein said operation controller controls said operation unit to ignore said instruction input to said control device and associated with said predetermined operation.

4. The control system of claim 1, wherein said operation controller limits an operation rate of said predetermined operation.

5. The control system of claim 4, wherein said predetermined operation includes a movement of said operation unit and wherein said operation controller limits a movement rate of said operation unit.

6. A control system for controlling an operation unit performing a plurality of operations, comprising:

an instruction unit to transmit an instruction to said operation unit to control said operation unit;

a detector to detect a load of a communication between said operation unit and said instruction unit; and an operation controller to limit a predetermined operation of said plurality of operations, depending on a detection result from said detector, wherein said operation controller gradually limits an operation rate of said predetermined operation depending on a level of the load detected by said detector.

\* \* \* \* \*